(12) United States Patent
Zarubinsky et al.

(10) Patent No.: US 8,532,424 B2
(45) Date of Patent: Sep. 10, 2013

(54) METHOD AND SYSTEM FOR FILTERING IMAGE DATA

(75) Inventors: Michael Zarubinsky, Rishon Lezion (IL); Roy Kehat, Hod Hasharon (IL); Alexander Sverdlov, Hod Hasharon (IL)

(73) Assignee: Freescale Semiconductor, Inc., Austin, TX (US)

( * ) Notice: Subject to any disclaimer, the term of this patent is extended or adjusted under 35 U.S.C. 154(b) by 876 days.

(21) Appl. No.: 12/094,572

(22) PCT Filed: Nov. 22, 2005

(86) PCT No.: PCT/IB2005/053859
§ 371 (c)(1),
(2), (4) Date: May 21, 2008

(87) PCT Pub. No.: WO2007/060498
PCT Pub. Date: May 31, 2007

(65) Prior Publication Data
US 2009/0022415 A1 Jan. 22, 2009

(51) Int. Cl.
*G06K 9/40* (2006.01)
(52) U.S. Cl.
USPC .......................................................... 382/260
(58) Field of Classification Search
None
See application file for complete search history.

(56) References Cited

U.S. PATENT DOCUMENTS

| 6,950,473 | B2 | 9/2005 | Kim et al. |
| 7,346,644 | B1 * | 3/2008 | Langhammer et al. ....... 708/625 |
| 7,881,385 | B2 * | 2/2011 | MacInnis et al. ........ 375/240.23 |
| 2001/0020906 | A1 | 9/2001 | Andrews et al. |
| 2002/0118399 | A1 | 8/2002 | Estevez et al. |
| 2003/0021489 | A1 | 1/2003 | Miura et al. |
| 2003/0219074 | A1 | 11/2003 | Park et al. |
| 2004/0076237 | A1 | 4/2004 | Kadono et al. |
| 2004/0228415 | A1 | 11/2004 | Wang |
| 2004/0247034 | A1 | 12/2004 | Zhong et al. |
| 2005/0024651 | A1 | 2/2005 | Yu et al. |
| 2005/0053288 | A1 | 3/2005 | Srinivasan et al. |
| 2005/0100241 | A1 | 5/2005 | Kong et al. |

(Continued)

FOREIGN PATENT DOCUMENTS
EP 1355498 A2 * 10/2003

OTHER PUBLICATIONS

List et al; "Adaptive Deblocking Filter" IEEE Transactions on Circuits and Systems for Video Technology, vol. 13, No. 7, Jul. 2003.

(Continued)

*Primary Examiner* — Claire X Wang
*Assistant Examiner* — Thomas A James (57) ABSTRACT

A device that includes at least one memory unit adapted to store image data; the device is characterized by including a configurable filter adapted to apply de-ringing filtering and de-blocking filtering such as to filter image data retrieved from the at least one memory unit, whereas the device is adapted to repetitively determine a configuration of the configurable filter in response to received image data and to at least one mode selection rule and to configure the configurable filter in response to the determination. A method for filtering image data, the method includes receiving or defining filtering mode selection rules; and receiving image data; whereas the method is characterized by including repeating the stages of: determining a configuration of a configurable filter that is adapted to perform de-ringing and de-blocking filtering, in response to the received image data and to at least one mode selection rule; configuring the configurable filter in response to the determination; and filtering, by the configurable filter, image data.

22 Claims, 7 Drawing Sheets

(56) References Cited

U.S. PATENT DOCUMENTS

2005/0123057 A1 6/2005 MacInnis et al.
2005/0147319 A1 7/2005 Deshpande et al.
2006/0008013 A1 1/2006 Pelc et al.

OTHER PUBLICATIONS

Pretty et al; "Reconfigurable DSP's for Efficient MPEG-4 Video and Audio Decoding" 1st IEEE International Workshop on Electronic Design, Test & Applications, USA, Jan. 2002.

Bernacchia et al; "A VLSI Implentation of a Reconfigurable Rational Filter" IEEE Transactions on Consumer Electronics, vol. 44, No. 3, Aug. 1998.

Dasu et al; "Reconfigurable Media Processing" Parallel Computing, vol. 28, No. 7-8, Aug. 2002, Elsevier Publishers, Amsterdam.

International Search Report mailed Jun. 30, 2006 for International Application No. PCT/IB2005/053859, 3 pages.

\* cited by examiner

METHOD AND SYSTEM FOR FILTERING IMAGE DATA

FIELD OF THE INVENTION

The present invention relates to methods and systems for filtering image data and especially for performing de-ringing and de-blocking filtering.

BACKGROUND OF THE INVENTION

Methods and systems for compressing and transmitting media signals are known in the art. Compressed digital video is largely becoming the preferred medium to transmit to video viewers everywhere. Parts of the Moving Pictures Experts Group (MPEG) specifications are standardized methods for compressing and transmitting video. The Telecommunication Standardization Sector of the International Telecommunication Union (ITU-T) also defines various compression standards including H.261, H.263, H.264 and the like.

In general, MPEG as well as ITU-T standards are used today for transmitting video over terrestrial, wireless, satellite and cable communication channels and also for storing digital video.

Some standardized compression/encoding standards utilize various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. Motion estimation involves searching, for each block (including N×M pixels, whereas N usually equals M), within a predefined area, a best matching block. The relative positions of these blocks are referred to as motion vector. Motion compensation involves calculating the differences between each block and the best matching block and encoding said difference by a spatial transformation, such as a Discrete Cosine Transform (DCT).

The block-based encoding has resulted in blocking artifacts. These artifacts appear at the boundary of adjacent blocks. This problem is usually more acute in low bit rate transmission systems, in which substantially strong quantization operation is applied.

In order to overcome these blocking artifacts two type of de-blocking filters were introduced. The first type is known as a post filter and the second type is known as a loop filter (or in-loop filter). The first type is applied after the encoding process ends while the loop filter is applied as a part of an encoding scheme. Encoders that include loop filter are characterized by better image quality.

A typical de-blocking filter, and especially an H.264/MPEG-4 compliant de-blocking filter can apply different filtering operation (in other words—operate in various filtering modes) in response to a boundary strength parameter. The different filtering modes differ by the strength of de-blocking filtering applied to the image data.

De-ringing filtering removes sudden transitions from a frame. The filtering process usually starts by a threshold-acquisition stage during which a maximal and a minimal pixel values within a group of pixels is searched. These values are used to calculate a threshold value. The threshold value is used to generate an index matrix in which value one is assigned to pixels within the group that have a value that is greater then the threshold. The other pixels are assigned with a value of zero. The index matrix is then clipped.

Various de-blocking filters, de-ringing filters and a combination of both filters can be found in the following patents, patent applications and article, all being incorporated herein by reference: U.S. patent application publication number 2004/0076237 of Kadono et al.; U.S. patent application publication number 2001/0020906 of Andrews at al.; U.S. patent application publication number 2005/0024651 of Yu et al.; U.S. patent application publication number 2005/0123057 of MacInnis et al.; U.S. patent application publication number 2002/0118399 of Estevez et al.; U.S. patent application publication number 2004/0228415 of Wang; U.S. patent application publication number 2003/0021489 of Miura et al.; U.S. patent application publication number 2003/0219074 of Park et al.; U.S. patent application publication number 2005/0100241 of Kong et al.; U.S. patent application publication number 2005/0147319 of Deshpande et al.; U.S. patent application publication number 2004/0247034 of Zhong et al.; U.S. patent application publication number 2005/0053288 of Srinivasan et al.; U.S. Pat. No. 6,950,473 of Kim et al.; and "Adaptive De-blocking Filter", by P. List, A. Joch, J. Lainema, G. Bjontegaard and M. Karczewicz, IEEE transactions on circuits and systems for video technology, Vol. 13, No. 7, July 2003.

Each one of the de-blocking filtering and the de-blocking filtering is very complex and requires many computational resources. Due to their complexities many prior art solutions use multiple hardware filters to perform these operations. Some prior art solutions provide a dedicated de-blocking filter that is tailored to perform de-blocking filtering while another filter is tailored to perform de-ringing filtering. This approach can provide a high-speed filter but it consumes a large amount of integrated circuit real estate.

There is a need to provide an efficient system and method for filtering image data.

SUMMARY OF THE PRESENT INVENTION

A device and a method for filtering image data, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENT

According to an embodiment of the invention a device and method for filtering image data is provided. The device includes at least one memory unit adapted to store image data.

The device further includes a configurable filter adapted to apply de-ringing filtering and de-blocking filtering such as to filter image data retrieved from the at least one memory unit, whereas the device is adapted to repetitively determine a configuration of the configurable filter in response to received image data and to at least one mode selection rule and to configure the configurable filter in response to the determination.

The method includes receiving or defining filtering mode selection rules; receiving image data; and repeating the stages of: (i) determining a configuration of a configurable filter that is adapted to perform de-ringing and de-blocking filtering, in response to the received image data and to at least one mode selection rule; (ii) configuring the configurable filter in response to the determination; and (iii) filtering, by the configurable filter, image data.

The configurable filter is capable of performing de-blocking and de-ringing operations, thus there is no need to use different filtering blocks. In addition, many circuits care used for both de-blocking and de-ringing, thus saving integrated circuit real estate.

Figure 1:
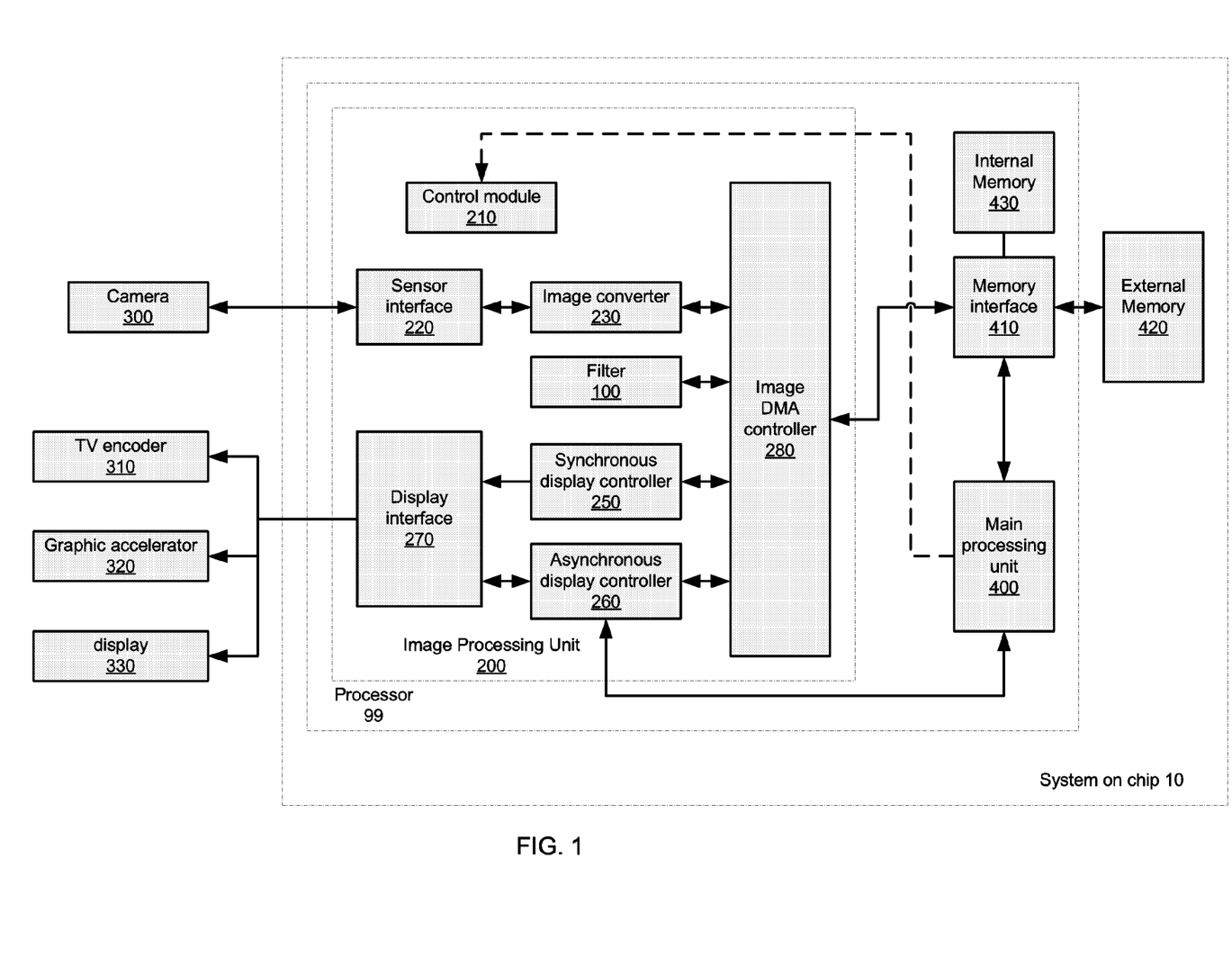
FIG. 1 is a schematic diagram of a device, according to an embodiment of the invention.

FIG. 1 illustrates a device 10, according to an embodiment of the invention. Device 10 can include one or more integrated circuits, can include one or more voltage supply units, can be a mobile device such as but not limited to a cellular phone, a laptop computer, a personal data accessory and the like.

Device 10 includes an external memory 420, processor 99 and an image-processing unit (IPU) 200. The processor 99 includes the IPU 200 as well as a main processing unit 400. Main processing unit 400 (also known as "general purpose processor", "digital signal processor" or just "processor") is capable of executing instructions. It is noted that device 10 can also be connected to some of the illustrated components instead of including these components.

The device 10 can be installed within a cellular phone or other personal data accessory and facilitate multimedia applications.

The IPU 200 is characterized by a low energy consumption level in comparison to the main processing unit 400, and is capable of performing multiple tasks without involving the main processing unit 400. The IPU 200 can access various memories by utilizing its own image Direct Memory Access controller (IDMAC) 280, can support multiple displays of various types (synchronous and asynchronous, having serial interfaces or parallel interfaces), and control and timing capabilities that allow, for example, displaying image frames while preventing image tearing.

The IPU 200 reduces the power consumption of the device 10 by independently controlling repetitive operations (such as display refresh, image capture) that may be repeated over long time periods, while allowing the main processing unit 400 to enter an idle mode or manage other tasks. In some cases the main processing unit 400 participates in the image processing stages (for example if image encoding is required), but this is not necessarily so.

The IPU 200 components can be utilized for various purposes. For example, the IDMAC 280 is used for video capturing, image processing and data transfer to display. The IPU 200 includes an image converter 230 capable of processing image frames from a camera 300, from an internal memory 430 or an external memory 420.

The device 10 includes multiple components, as well as multiple instruction, control and data buses. For simplicity of explanation only major data buses as well as a single instruction bus are shown.

According to various embodiment of the invention the IPU 200 is capable of performing various image processing operations, and interfacing with various external devices, such as image sensors, camera, displays, encoders and the like. The IPU 200 is much smaller than the main processing unit 400 and consumes less power.

The IPU 200 includes a configurable filter 100 that is capable of performing various filtering operations such as de-blocking filtering, de-ringing filtering and the like. Various prior art methods for performing said filtering operations are known in the art and require no additional explanation.

The configurable filter 100 can perform de-blocking and de-ringing filtering operations, according to multiple standards and/or conveniently is capable of performing non-standard filtering operations. By using a single configurable filter the area allocated to the filter is smaller than the area that is required for implementing separate de-ringing and de-blocking filters.

By performing de-blocking filtering operation by configurable filter 100, instead of main processing unit 400, the IPU 200 reduces the computational load on the main processing unit 400. In one operational mode the configurable filter 100 can speed up the image processing process by operating in parallel to the main processing unit 400.

IPU 200 includes control module 210, sensor interface 220, image converter 230, configurable filter 100, IDMAC 280, synchronous display controller 250, asynchronous display controller 260, and display interface 270.

The IPU 200 has a first circuitry that may include at least the sensor interface 220, but may also include additional components such as IDMAC 280. The first circuitry is adapted to receive a sequence of image frames at an update rate (Ur). The IPU 200 also includes a second circuitry that may include at least the asynchronous display controller 260.

The sensor interface 220 is connected on one side to an image sensor such as camera 300 and on the other side is connected to the image converter 230. The display interface 270 is connected to the synchronous display controller (SDC) 250 and in parallel to the asynchronous display controller (ADC) 260. The display interface 270 is adapted to be connected to multiple devices such as but not limited to TV encoder 310, graphic accelerator 320 and display 330.

The IDMAC 280 facilitates access of various IPU 200 modules to memory banks such as the internal memory 430 and the external memory 420. The IDMAC 280 is connected to on one hand to the image converter 230, configurable filter 100, SDC 250 and ADC 260 and on the other hand is connected to memory interface 410. The memory interface 410 is be connected to internal memory 430 and additional or alternatively, to an external memory 420.

The sensor interface 220 captures image data from camera 300 or from a TV decoder (not shown). The captured image data is arranges as image frames and can be sent to the image converter 230 for preprocessing or post processing, but the captured data image can also be sent without applying either of these operations to IDMAC 280 that in turn sends it, via memory interface 410 to internal memory 430 or external memory 420.

The image converter 230 is capable of preprocessing image data from the sensor interface 220 or post-processing image data retrieved from the external memory 420 or the internal memory 430. The preprocessing operations, as well as the post-processing operations include downsizing, resizing, color space conversion (for example YUV to RGB, RGB to YUV, YUV to another YUV), image rotation, up/down and left/right flipping of an image and also combining a video image with graphics.

The display interface 270 is capable of arbitrating access to multiple displays using a time multiplexing scheme. It converts image data form SDC 250, ADC 260 and the main processing unit 400 to a format suitable to the displays that are connected to it. It is also adapted to generate control and timing signals and to provide them to the displays.

The SDC 250 supports displaying video and graphics on synchronous displays such as dumb displays and memory-less displays, as well on televisions (through TV encoders). The ADC 260 supports displaying video and graphics on smart displays.

The IDMAC 280 has multiple DMA channels and manages access to the internal and external memories 430 and 420.

In a typical scenario image data is retrieved from an external memory 420 to IDMAC 280, IDMAC 280 sends the image data to the image converter 230 in which the image data is post-processed, the image data is then sent to configurable filter 100 to be post-processed and is then sent to (via IDMAC 280) to ADC 260. ADC 260 sends the filtered image data to display 330 via display interface 270. It is noted that image data can be processed in various manners as well as propagate between different components of device 10.

Those of skill in the art will appreciate that configurable filter 100 can be includes within various devices that differ from the exemplary device 10 of FIG. 1.

Figure 2:
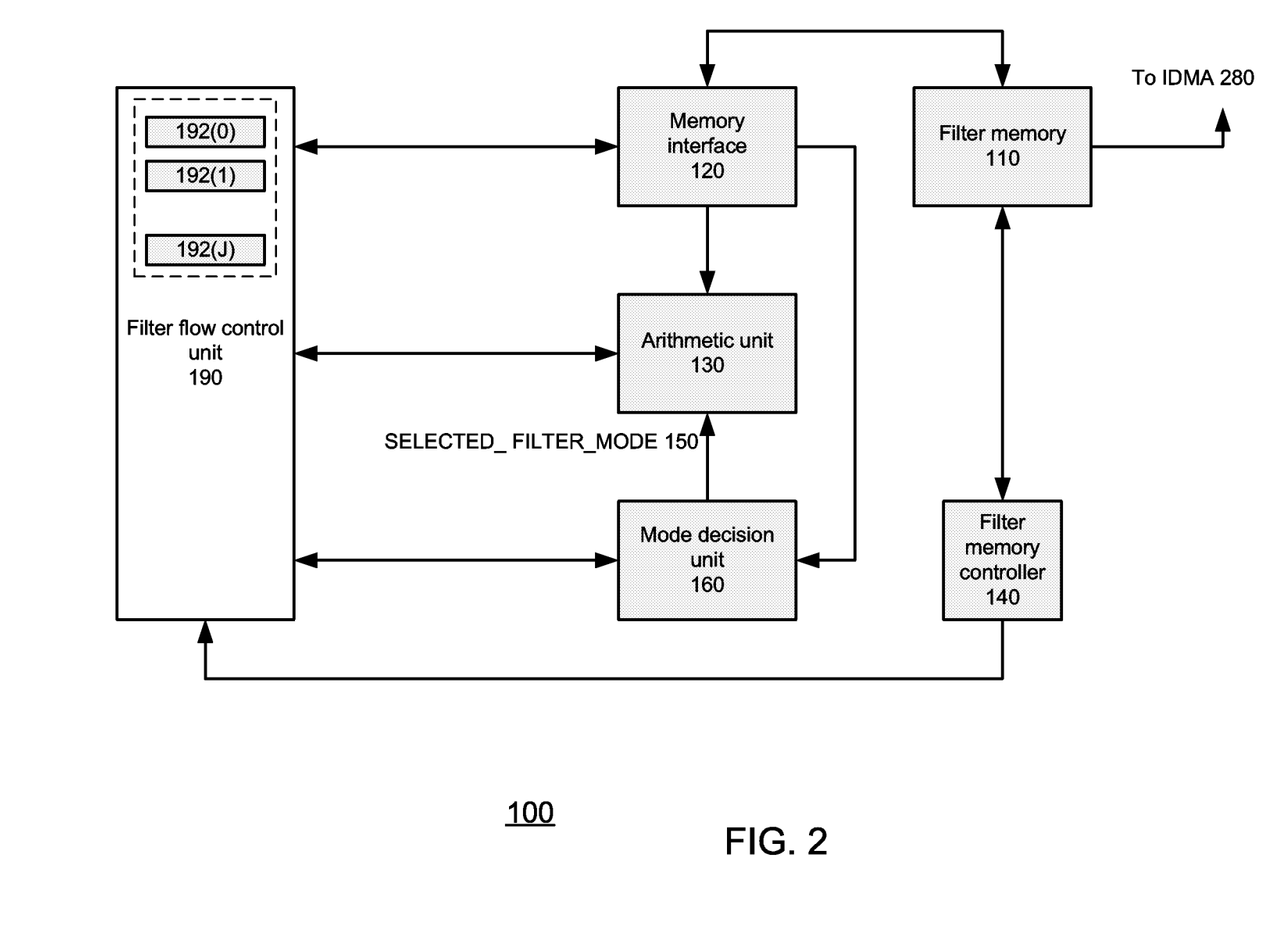
FIG. 2 illustrates a configurable filter, according to an embodiment of the invention.

FIG. 2 illustrates a configurable filter 100, according to an embodiment of the invention.

Configurable filter 100 includes a filter flow control unit 190, a memory interface 120, an arithmetic unit 130, a mode decision unit 160, a filter memory controller and a filter memory 110. Conveniently, filter memory 110 stores data representative of multiple macro-blocks.

Arithmetic unit 130 is connected to filter flow control unit 190, to memory interface 120, and to mode decision unit 160. Memory interface 120 is connected to mode decision unit 160, to filter flow control unit 190 and to filter memory 110. Filter memory 110 is further connected to IDMA 280 and to the filter memory controller 140. Filter flow control unit 190 is further connected to the mode decision unit 160 and to filter memory controller 140.

A filtering process requires to selectively retrieve portions of image data, perform filtering operations and provide filtered portions image data. These selective retrieval stages and the relative timings of data retrieval and filtering operations are usually determined in various standards. It is noted that retrieval stages and timings can be also defined in non-standard manners. The filter flow control unit 190 controls the retrieval process, as well as the timing of data retrieval and filtering operations, by sending control signals to various components including the memory interface 120, the arithmetic unit 130, the mode decision unit 160 and the filter memory controller 140.

Conveniently, the filter flow control unit 190 includes multiple state machines that are adapted to control various data retrieval and filtering sessions. These state machines are denoted 192(1)-192(K). The inventors used a filter flow control unit 190 that included a MPEG-4 post filtering state machine and a H.264 post filtering state machine. The MPEG-4 post filtering state machine interacted with a MPEG-4 column de-blocking state machine, a MPEG-4 row de-blocking state machine, and a MPEG-4 de-ringing state machine. The H.264 post filtering state machine interacted with a H.264 row de-blocking state machine, and a H.264 column de-blocking machine.

Figure 3:
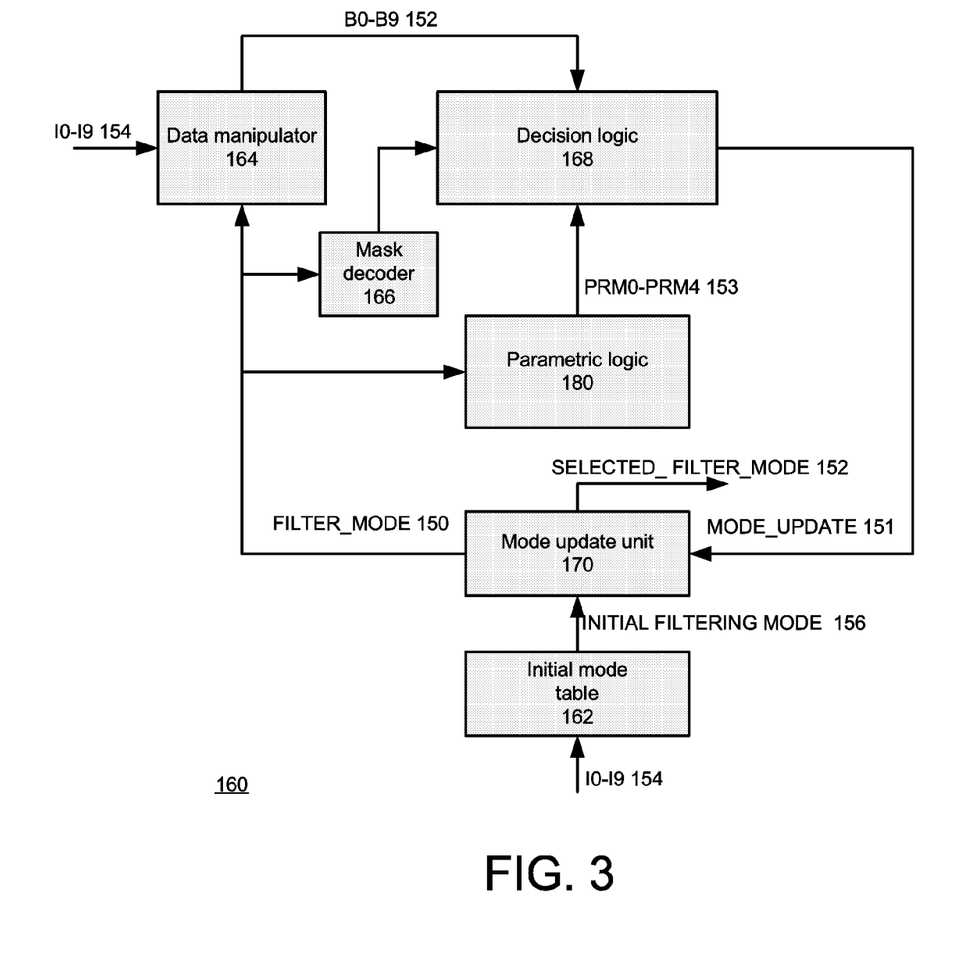
FIG. 3 illustrates a mode decision unit, according to an embodiment of the invention.

FIG. 3 illustrates a mode decision unit 160, according to an embodiment of the invention.

The mode decision unit 160 includes an initial mode table 162, a mode update unit 170, parametric logic 180, decision logic 168, a mask decoder 166 and a data manipulator 164.

The initial table mode 162 is connected to the mode update unit 170. The mode update unit 170 is connected to the data manipulation unit 164, the mask decoder 166, the parametric logic 168 and the decision logic 168. The mask decoder 166 and the data manipulator 164 are also connected to the decision logic 168.

The decision logic 168 has do decide whether a currently evaluated filtering mode is valid or not valid. If it is valid then this is the filtering mode that should be applied by the arithmetic unit 130. If the filtering mode is not valid then another filtering mode should be evaluated or the filtering process should stopped.

The decision logic 168 receives as inputs from the data manipulator output signals BO-B9 collectively denoted 152. It receives threshold parameters P4-P0 collectively denoted 153 from the parametric logic 180. The data manipulator logic 164 receives as input signals I1-I9 collectively denoted 164. The parametric logic 180 receives various parameters as well as input data INT_DATA 119. TABLE 1 illustrates the values of BO-B9 and of P4-P0 in response to the selected filtering mode. TABLE 1 defines which information shall be taken into account by decision logic 168, as further explained below TABLE 1.

MD indicates the filtering mode. Mode 0 does not involve filtering. Modes 1-18 are different MPEG-4 de-blocking filtering modes, modes 19-22 are different H.264 luma de-blocking filtering modes, mode 23 is a filtering mode of H.264 chroma de-blocking where Bs=1, 2, 3, modes 24-27 are different filtering modes for H.264 luma de-blocking where Bs=4, mode 28 is a filtering mode for H.264 chroma de-blocking where Bs=4, and modes 29-33 are different filtering modes for MPEG-4 de-ringing.

TABLE 1

| | Threshold parameters | | | | | Data manipulator output | | | | | | | | | | Mask |
|---|---|---|---|---|---|---|---|---|---|---|---|---|---|---|---|---|
| MD | P4 | P3 | P2 | P1 | P0 | B9 | B8 | B7 | B6 | B5 | B4 | B3 | B2 | B1 | B0 | M |
| 0 | X | X | X | X | X | X | X | X | X | X | X | X | X | X | X | X |
| 1 | X | X | QPB1 | QPB2 | QPB1 | X | X | X | X | I6 | I5 | I5 | I4 | I4 | I3 | 0 |
| 2 | X | X | QPB2 | QPB3 | QPB2 | X | X | X | X | I6 | I5 | I5 | I4 | I4 | I3 | 7 |
| 3 | X | X | X | X | 2QP | X | X | X | X | X | X | X | X | I0 | I1 | 7 |
| 4 | X | X | X | X | 2QP | X | X | X | X | X | X | X | X | I0 | I2 | 1 |
| 5 | X | X | X | X | 2QP | X | X | X | X | X | X | X | X | I1 | I3 | 1 |
| 6 | X | X | X | X | 2QP | X | X | X | X | X | X | X | X | I2 | I4 | 1 |
| 7 | X | X | X | X | 2QP | X | X | X | X | X | X | X | X | I3 | I5 | 1 |
| 8 | X | X | X | X | 2QP | X | X | X | X | X | X | X | X | I4 | I6 | 1 |
| 9 | X | X | X | X | 2QP | X | X | X | X | X | X | X | X | I5 | I7 | 1 |
| 10 | X | X | X | X | 2QP | X | X | X | X | X | X | X | X | I2 | I4 | 1 |
| 11 | X | X | X | X | 2QP | X | X | X | X | X | X | X | X | I3 | I5 | 1 |
| 12 | X | X | X | X | 2QP | X | X | X | X | X | X | X | X | I4 | I6 | 1 |

TABLE 1-continued

| | Threshold parameters | | | | | Data manipulator output | | | | | | | | | | Mask |
|---|---|---|---|---|---|---|---|---|---|---|---|---|---|---|---|---|
| MD | P4 | P3 | P2 | P1 | P0 | B9 | B8 | B7 | B6 | B5 | B4 | B3 | B2 | B1 | B0 | M |
| 13 | X | X | X | X | 2QP | X | X | X | X | X | X | X | X | I5 | I7 | 1 |
| 14 | X | X | X | X | 2QP | X | X | X | X | X | X | X | X | I6 | I8 | 1 |
| 15 | X | X | X | X | 2QP | X | X | X | X | X | X | X | X | I7 | I9 | 1 |
| 16 | X | X | X | X | 2QP | X | X | X | X | X | X | X | X | I8 | I9 | 1 |
| 17 | X | X | 4QP | 4QP | 4QP | X | X | X | X | I4 | I0 | I9 | I5 | I7 | I2 | 7 |
| 18 | X | X | 4QP | 4QP | 4QP | X | X | X | X | I4 | I0 | I9 | I5 | I7 | I2 | 7 |
| 19 | β | β | β | β | A | I4 | I6 | I1 | I3 | I2 | I3 | I5 | I4 | I3 | I4 | 7 |
| 20 | β | β | X | β | β | I4 | I6 | I1 | I3 | X | X | I1 | I3 | I6 | I4 | 3 |
| 21 | β | β | X | β | β | I4 | I6 | I1 | I3 | X | X | X | I3 | I1 | I1 | 1 |
| 22 | β | β | X | β | X | I4 | I6 | I1 | I3 | X | X | I6 | I4 | X | X | 2 |
| 23 | X | X | β | β | α | X | X | X | X | I2 | I3 | I5 | I4 | I3 | I4 | 7 |
| 24 | X | X | β | β | αU | X | X | X | X | I2 | I2 | I5 | I4 | I3 | I4 | 7 |
| 25 | X | X | β | β | αU | X | X | X | X | I1 | I3 | I6 | I4 | I3 | I4 | 7 |
| 26 | X | X | X | β | αU | X | X | X | X | X | X | I3 | I1 | I3 | I4 | 3 |
| 27 | X | X | β | X | αU | X | X | X | X | I6 | I4 | X | X | I3 | I4 | 5 |
| 28 | X | X | β | β | α | X | X | X | X | I2 | I3 | I5 | I4 | I3 | I4 | 15 |
| 29 | X | QP2 | QP2 | QP1 | QP1 | I5 | I3 | I5 | I3 | I7 | I1 | I3 | I4 | I1 | I4 | 15 |
| 30 | X | QP2 | QP2 | QP1 | QP1 | I5 | I3 | I5 | I3 | I7 | I1 | I3 | I4 | I1 | I4 | 15 |
| 31 | X | QP2 | QP2 | QP1 | QP1 | I5 | I3 | I5 | I3 | I7 | I1 | I3 | I4 | I1 | I4 | 15 |
| 32 | X | QP2 | QP2 | QP1 | QP1 | I5 | I3 | I5 | I3 | I7 | I1 | I3 | I4 | I1 | I4 | 15 |
| 33 | X | X | X | X | X | X | X | X | X | X | X | X | X | X | X | 0 |

Conveniently, the decision involves selecting one condition out of multiple conditions and determining if the selected condition is fulfilled. The following equations represent three exemplary conditions:

(i) |B0-B1|<P0 and |B2-B3|<P1;
(ii) |B0-B1|<P0 and |B2-B3|<P1 and |B4-B5|<P2;
(iii) |B0-B1|<P0 and |B2-B3|<P1 and |B4-B5|<P2 and |B7-B7|<P3.

If one of the conditions is fulfilled then decision logic 168 negates MODE_UPDATE 151, else this signal is asserted. This signal is provided to mode update unit 170 that in turn determines whether to retrieve successful evaluation filter mode information (if MODE_UPDATE 151 indicates that the mode is valid) or to retrieve failed evaluation filter mode information (if MODE_UPDATE 151 indicates that the evaluation failed).

The mode update unit 170 outputs SELECTED_FILTER_MODE 152 to the arithmetic unit 130 to indicate what is the selected filtering mode, and also outputs FILTER_MODE 150 to the mask decoder 166, parametric logic 180 and data manipulator 164 to indicate the next filtering mode to be evaluated. If the value of the failed evaluation filter mode information is zero the evaluation ends and no filtering process is applied.

If the evaluation is successful than both SELECTED_FILTER_MODE 152 and FILTER_MODE 150 will indicate what is the selected filtering mode.

The mask decoder 166 receives the FILTER_MODE 150 signal and indicates (this indication is sent to decision logic 168) which one of equations (i)-(iii) to check.

Figure 4:
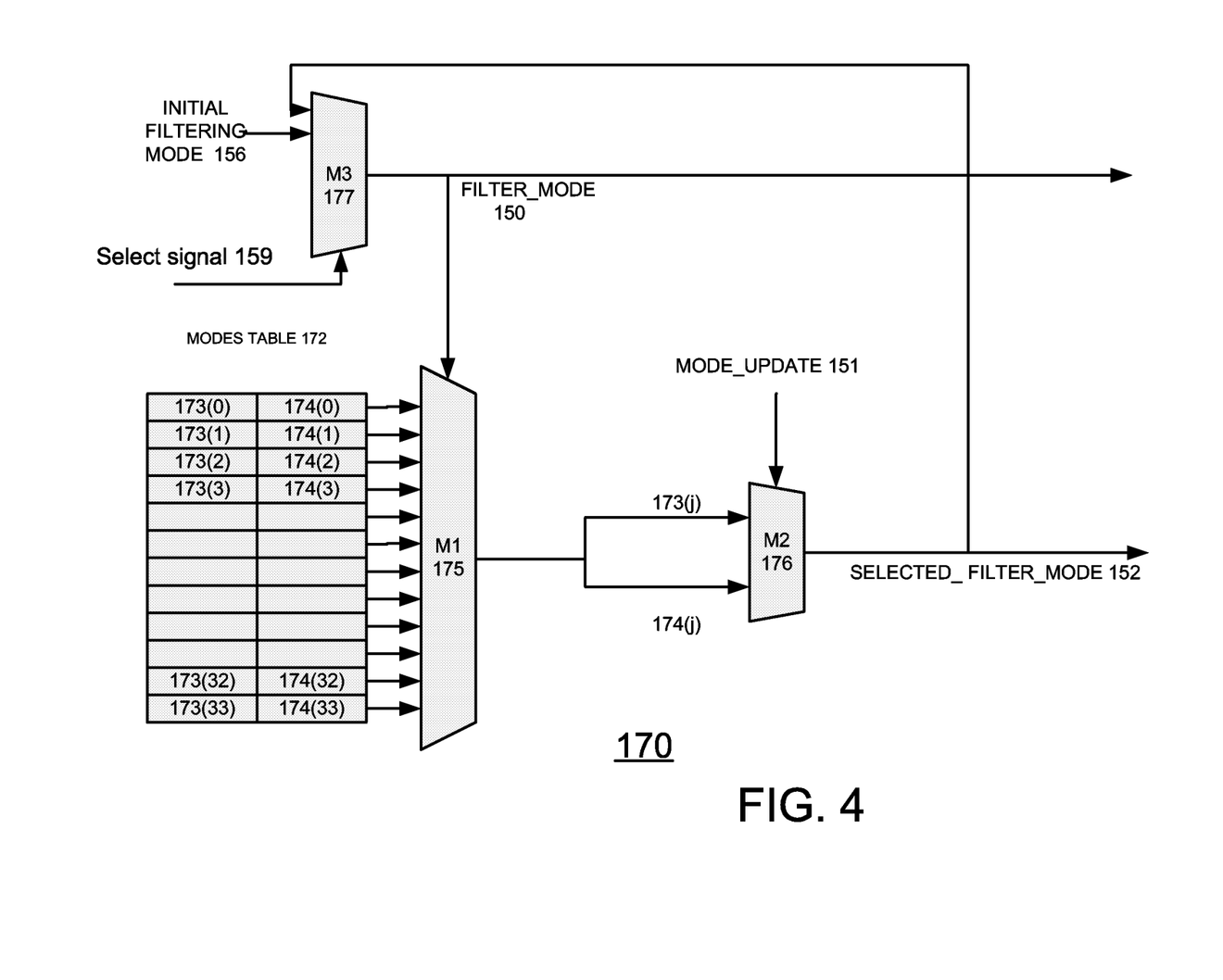
FIG. 4 illustrates a mode update unit, according to an embodiment of the invention.

FIG. 4 illustrates mode update unit 170, according to an embodiment of the invention.

Mode update unit 170 includes modes lookup table 172 that stores successful evaluation filter mode information and failed evaluation filter mode information. Each entry of table 172 corresponds to a different filtering mode out of modes zero to J. FIG. 4 illustrates a thirty four entry table (J equals 33) but this is not necessarily so. Each entry includes successful evaluation filter mode information 173(1)-173(33) and also a failed evaluation filter mode information 174(1)-174(33). The former indicates a selected valid filtering mode and the latter indicates the next filtering mode to be evaluated, if an evaluation of a current filtering mode failed.

An exemplary modes lookup table is illustrated below:

TABLE 2

| Filtering process | Entry number (j) | True 173(j) | False 174(j) |
|---|---|---|---|
| No filtering | 0 | 0 | 0 |
| MPEG-4 de-blocking | 1 | 1 | 2 |
| | 2 | 2 | 0 |
| | 3 | 3 | 0 |
| | 4 | 4 | 0 |
| | 5 | 5 | 0 |
| | 6 | 6 | 0 |
| | 7 | 7 | 0 |
| | 8 | 8 | 0 |
| | 9 | 9 | 0 |
| | 10 | 10 | 0 |
| | 11 | 11 | 0 |
| | 12 | 12 | 0 |
| | 13 | 13 | 0 |
| | 14 | 14 | 0 |
| | 15 | 15 | 0 |
| | 16 | 16 | 0 |
| | 17 | 17 | 0 |
| | 18 | 18 | 0 |
| H.264 luma de-blocking Bs = 1, 2, 3 | 19 | 19 | 0 |
| | 20 | 20 | 21 |
| | 21 | 21 | 22 |
| | 22 | 22 | 19 |
| H.264 chroma de-blocking Bs = 1, 2, 3 | 23 | 23 | 0 |
| H.264 luma de-blocking Bs = 4 | 24 | 24 | 0 |
| | 25 | 25 | 26 |
| | 26 | 26 | 27 |
| | 27 | 27 | 24 |
| H.264 chroma de-blocking Bs = 4 | 28 | 28 | 0 |
| MPEG-4 de-ringing | 29 | 29 | 30 |
| | 30 | 30 | 31 |
| | 31 | 31 | 32 |
| | 32 | 32 | 33 |
| | 33 | 33 | 33 |

Each entry of table 172 is connected to a multiplexer M1 175 that selects which entry to retrieve in response to the value (j) of FILTER_MODE 150. The jth successful evaluation filter mode information 173(j) and the jth failed evaluation filter mode information 174(j) are provided to a second multiplexer M2 176 that selected between these information in response to the value of MODE_UPDATE 151.

Figure 5:
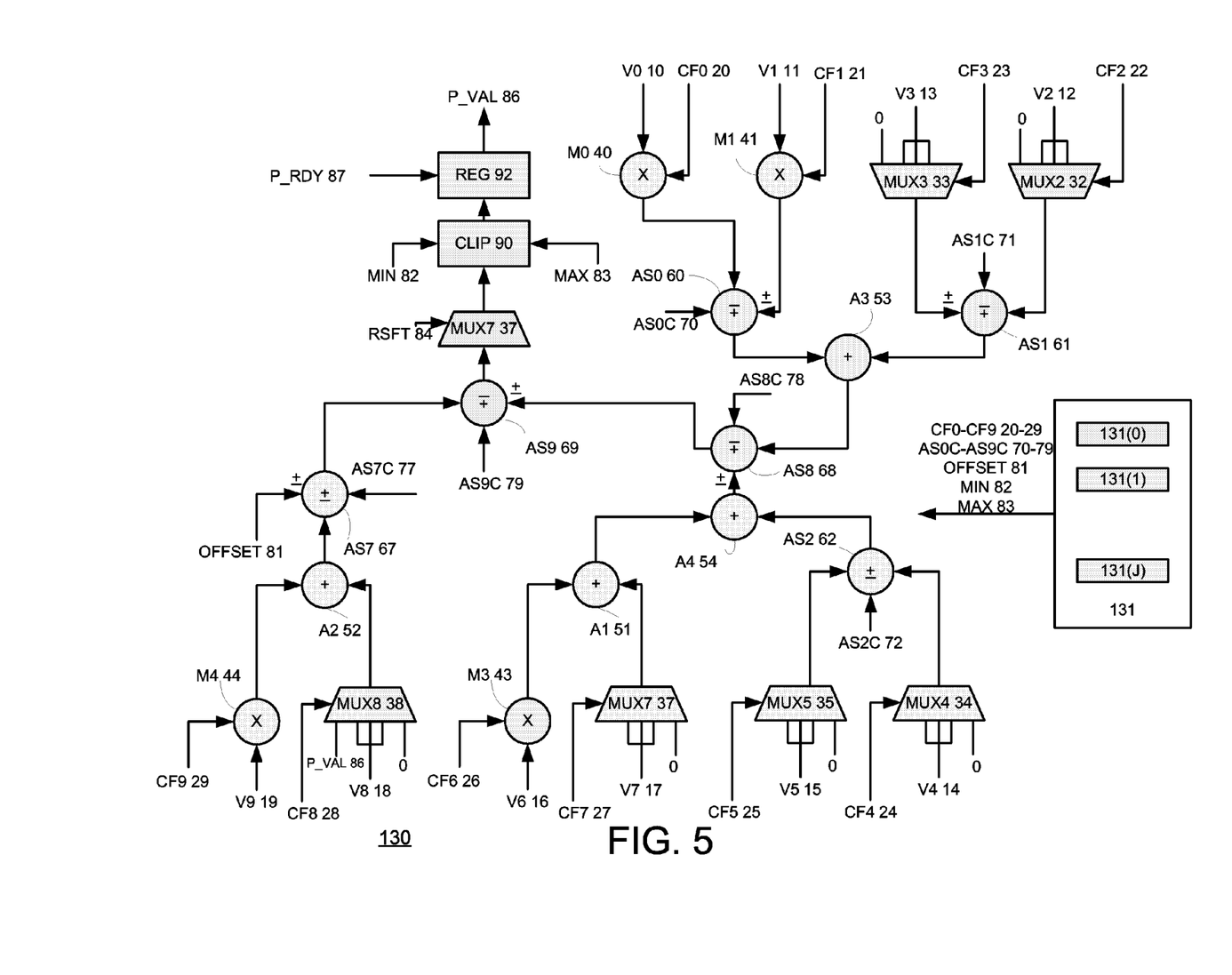
FIG. 5 illustrates an arithmetic unit, according to an embodiment of the invention.

The output of M2 167 provided output signal SELECTED_FILTER_MODE 152. The output of M2 167 us also connected to one inputs of multiplexer M3 177, Other inputs of multiplexer M3 177 receive an INITIAL FILTERING MODE signal 156 which provides an indication on an initial arithmetic unit 130, v0-v9 10-19 from memory interface 120 as well as additional control signals such as Cycle_count signal (not shown) that counts the pixels that are filtered by the arithmetic unit 130. Te filtering process can apply different filters to each pixel.

TABLE 3 illustrates the connectivity of various components of arithmetic unit 130.

TABLE 3

| Cir. | 1$^{st}$ input | 2$^{nd}$ input | 3$^{rd}$ input | 4$^{th}$ input | cnt | output |
|---|---|---|---|---|---|---|
| M4 | V9 | CF9 | | | | 1$^{st}$ input A2 |
| MUX8 | P_VAL | V8 | V8 | 0 | CF8 | 2$^{nd}$ input A2 |
| A2 | M4 | MUX8 | | | | 1$^{st}$ input AS7 |
| AS7 | A2 | OFFSET | | | AS7C | 1$^{st}$ input AS9 |
| AS9 | AS7 | AS8 | | | AS9C | MUX39 |
| MUX39 | AS9 | AS9 | AS9 | AS9 | REFT | CLIP |
| CLIP | MUX9 | MIX | MIN | | | REG |
| REG | CLIP | | | | P_RDY | P_VAL |
| M3 | V6 | CF6 | | | | 1$^{st}$ input A1 |
| MUX7 | V7 | V7 | V7 | 0 | CF7 | 2$^{nd}$ input A1 |
| A1 | M3 | MUX7 | | | | 1$^{st}$ input A4 |
| A4 | A1 | AS2 | | | | 2$^{nd}$ input AS8 |
| MUX5 | V5 | V5 | V5 | 0 | CF5 | 2$^{nd}$ input AS2 |
| MUX4 | V4 | V4 | V4 | 0 | C45 | 1$^{st}$ input AS2 |
| AS2 | MUX4 | MUX5 | | | AS2C | 2$^{nd}$ input A4 |
| AS8 | A3 | AS2 | | | AS8C | 2$^{nd}$ input AS9 |
| M0 | V0 | CF0 | | | | 1$^{st}$ input AS0 |
| M1 | V1 | CF1 | | | | 2$^{nd}$ input AS0 |
| AS0 | M0 | M1 | | | AS0C | 1$^{st}$ input A3 |
| A3 | AS0 | AS1 | | | | 1$^{st}$ input AS8 |
| MUX3 | 0 | V3 | V3 | V3 | CF3 | 2$^{nd}$ input AS1 |
| MUX2 | 0 | V2 | V2 | V2 | CF2 | 1$^{st}$ input AS1 |
| AS1 | MUX2 | MUX3 | | | AS1C | 2$^{nd}$ input A3 | filtering mode information (INITIAL_FILTERING_MODE 156). The initial filtering mode information is selected during initialization stages of filter 100.

The selection between various signals that are provided to M3 177 is done by select signal 159 provided by filter flow control unit 190.

FIG. 5 illustrates arithmetic unit 130, according to an embodiment of the invention.

The arithmetic unit 130 includes multiple filter coefficient lookup tables (131(1)-131(J)) that form a filter coefficient bank 131. If the j'th filtering mode is selected then the 131(j) filter coefficient lookup table is retrieved from the filter coefficient bank 131 and is used to configure the multiple add-subtract circuits (70, 71, 77, 78, 79). as well as to provide various filter coefficients (such as CF0-CF9 20-29, OFFSET 81, MIN 82, MAX 83,) that affect the value (P_VAL 86) of the filtered pixel.

Arithmetic unit 130 includes multiple add-subtract circuits AS1 61, AS2 62, AS7 67, AS8 68, and AS9 69. Each add-subtract circuit can act as an adder or as a subtracting circuit in response to a control signal. Thus, each add-subtract circuit adds the first input to a second input (when it acts as an adder) or subtracts the second input from the first input (when it acts as a subtracting circuit). The second input is denoted by a "±" symbol.

Arithmetic unit 130 also includes: (i) multiplexers MUX2 32, MUX3 33, MUX4 34, MUX5 35, MUX7 37, MUX8 38 and MUX9 39; (ii) multipliers M0 40, M1 41, M3 43 and M4 44; (iii) adders A1 51, A2 52, A3 53 and A4 54; and (iv) clipping unit 90 and register 92. Clipping unit 90 provides a clipped value that ranges between MIN 82 and MAX 83.

Arithmetic unit 130 receives multiple coefficients CF0-CF9 20-29, OFFSET 81, MIN 82, MAX 83, and RSFT 84 from a the j'th coefficient look up table 131(j) within the Register REG 92 provides a pixel value signal P_VAL 86 at a timing determining by a pixel ready signal (P_RDY 87).

In most cases the coefficients equaled zero, although in some cases their values also was 1, 2, 3 and 4.

Figure 6:
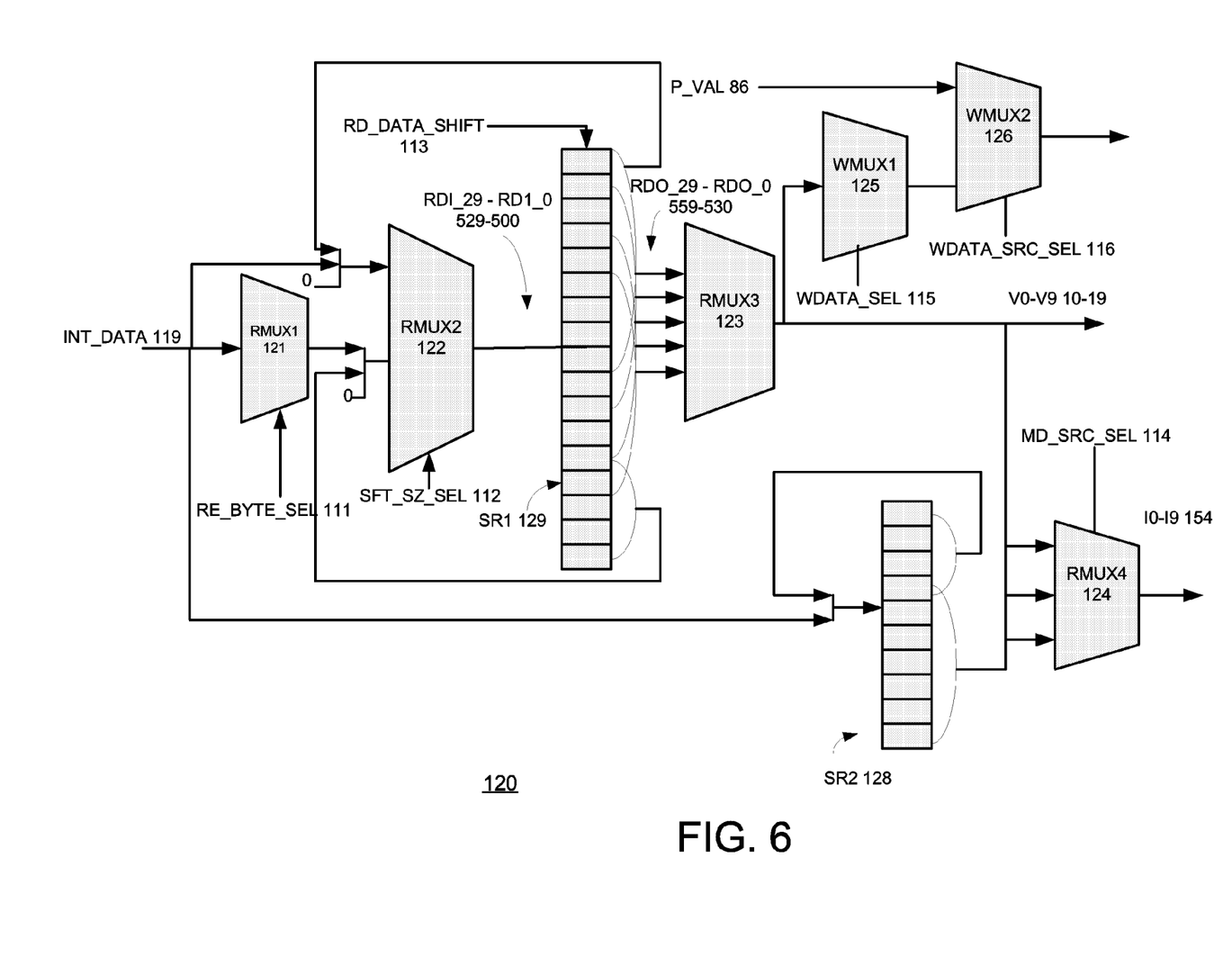
FIG. 6 illustrates a memory interface, according to an embodiment of the invention.

FIG. 6 illustrates memory interface 120, according to an embodiment of the invention.

Memory interface 120 receives image data and manipulates it to provide various signals to the arithmetic unit 130 (V0-V9 10-19) and to the mode decision unit (I0-I9 154).

The memory interface 120 includes a read path and a write path. The write path includes multiplexers WMUX1-WMUX2 125-126. The read path includes shift registers SR1 129 and SR2 128, and read multiplexers RMUX1-RMUX4 121-124. The memory interface 120 and especially the read path perform data manipulations and can provide output signals that are responsive to current image data as well as pervious image data.

RMUX1 121 receives as input a sixty-four bits wide input data INT_DATA 119. It outputs eight bits that are selected in response to a RD_BYTE_SEL 111 signal.

RMUX1 122 receives two one-hundred and twenty eight bits wide inputs. The first input receives sixty four bits of INT_DATA 119, multiple zero bits and sixty four bits of previous image data from shift register SR1 129. The second input receives the byte from RMUX1 121, multiple zero bits and one hundred and twenty bits of previous image data from shift register SR1 129.

RMUX2 122 receives two inputs, each of two hundred and forty bits. A first input of RMUX2 122 eight bits of the output of RMUX 121, one hundred and twenty bits from the output of SR1 129 and one hundred and ten zeros. A second input of RMUX2 122 receives sixty four bits of INT_DATA 119, sixty four bits from the output of SR1 129 and one hundred and ten zeros.

Shift register SR1 outputs multiple partially overlapping groups of forty bits denoted RDI_0-RDI_29. Some are sent back to the inputs of RMUX2 122 and some are provided to RMUX2 124 and WMUX1 125.

RMUX3 123 is controller by signal RD_DATA_SHIFT 113 provided by unit 190. Eighty output bits of SR1 129 are provided as V9-V0 to arithmetic unit 130.

SR2 129 is controlled by a control signals that performs shifting operations. It receives as input sixty four bits of INT_DATA 119 and forty bits from its output.

A first input of RMUX4 124 receives eighty bits from shift register SR2 128. A second input of RMUX4 124 receives seventy two bits from shift register SR2 128 and eight bits from the output of RMUX3 123. A third input of RMUX4 124 receives eighty bits from the output of RMUX3 123. One of these inputs are selected by MD_SRC_SEL 114 and is provided as I0-I9 154 to mode decision unit 160.

WMUX1 125 receives as input eighty bits of V9-V0 and selects only eight bits (according to control signal WDATA_SEL 115). These eight bits are provided to a first input of WMUX2 126. The second input of WMUX2 126 receives P_VAL 86. WMUX2 126 selects between these signals in response to WDATA_SRC_SEL 116 signal.

Figure 7:
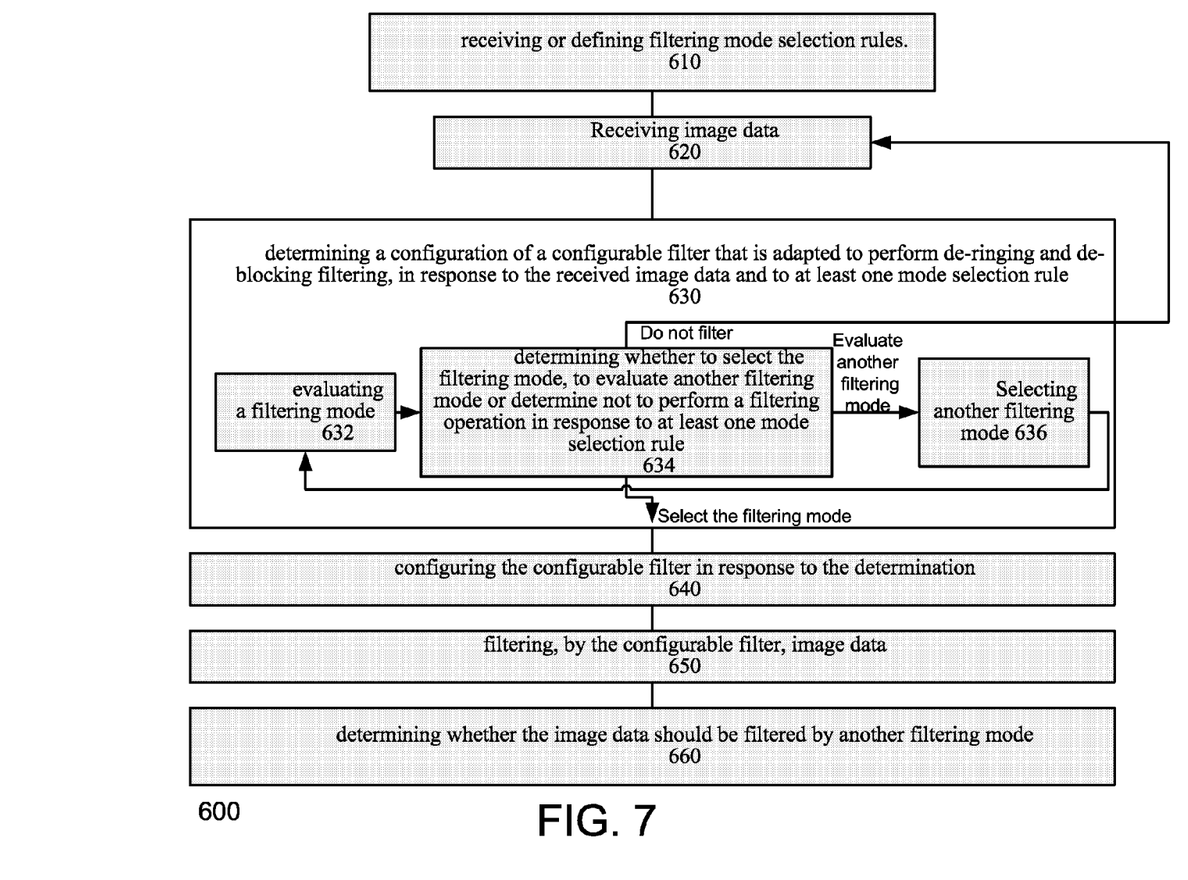
FIG. 7 is a flow chart of a method for performing de-ringing and de-blocking filtering, according to an embodiment of the invention.

FIG. 7 is a flow chart of a method 600 for filtering image data, according to an embodiment of the invention.

Method 600 starts by stage 610 of receiving or defining filtering mode selection rules. The filtering mode selection rules can include, for example, filtering mode evaluation rules (for example equations (i)-(iii), the decisions illustrated in TABLE 1) the modes lookup table, and the like.

Stage 610 is followed by stage 620 of receiving image data. Referring to the example set forth in FIG. 1 and in FIG. 2, relatively large amounts of image data is received and stored within internal memory 430 and/or external memory 420. Smaller portions of image data that are used during the filtering process are stored in filter memory 110 and that are selectively provided to the arithmetic unit 130 and mode decision unit 160 by memory interface 120.

Stage 620 is followed by stage 630 of determining a configuration of a configurable filter that is adapted to perform de-ringing and de-blocking filtering, in response to the received image data and to at least one mode selection rule. Referring to the examples set forth in FIG. 2-FIG. 4 the determination can include one or more iterations of evaluating a filtering mode (for example by mode decision unit 160), and in response to the result of the evaluation either declaring an evaluated mode Stage 630 is followed by stage 640 of configuring the configurable filter in response to the determination. For example, selected coefficients such as CF0-CF9 10-19 are provided to arithmetic unit 130. In addition the various add-subtract units are set to perform addition or subtraction operations.

Conveniently, stage 630 includes stage 632 of evaluating a filtering mode; and stage 643 of determining whether to select the filtering mode, to evaluate another filtering mode or determine not to perform a filtering operation in response to at least one mode selection rule. Conveniently, stage 634 includes selecting between successful evaluation filter mode information and failed evaluation filter mode information. For example, the content of the mode lookup table can be selectively retrieves and a selection between failed or successful evaluation filter mode information 174(J) or 173(J) accordingly. If a new filtering mode is going to be evaluated stage 634 is followed by stage 436 of selecting a new filtering mode and then jumping to stage 632. The selection can be implemented, for example, by checking the information retrieved from the modes table.

Conveniently, stage 630 includes selecting a filtering control state machine out of multiple control state machines. It is noted that this stage can occur before stage 620, in parallel to stage 630 and the like. Referring to the example set forth in FIG. 5, the selection may include selecting a state machine out of: (i) MPEG-4 post filtering state machine, (ii) MPEG-4 column de-blocking state machine, (iii) MPEG-4 row de-blocking state machine, (iv) MPEG-4 de-ringing state machine, (v) H.264 post filtering state machine, (vi) H.264 row de-blocking state machine, and (vii) H.264 column de-blocking state machine.

Conveniently, stage 630 includes selecting a filter coefficient lookup table out of multiple filter coefficient lookup table. In such a case stage 640 may include retrieving filter coefficients from the selected filter coefficient lookup table.

Stage 640 is followed by stage 650 of filtering, by the configurable filter, image data. The filter can be configured differently after filtering one or more pixels, after filtering one or more macroblocks and the like.

Conveniently, stages 630 and 650 include manipulating current image data and previous image data.

Stage 650 is followed by stage 660 of determining whether the image data should be filtered by another filtering mode (for example—if a de-blocking algorithm was applied—should the configurable filter perform de-ringing filtering). If the answer is positive stage 660 is followed by stage 630. Else, stage 660 is followed by stage 620.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for filtering image data, the method comprises:
   receiving a first mode selection rule; and receiving first image data;
   determining a second mode selection rule based on the first mode selection rule and the first image data;
   determining first mode evaluation data based on the second mode selection rule and second image data;
   in response to determining the first mode evaluation data matches first criteria:
      determining, by a configurable filter, a first configuration of the configurable filter that is adapted to perform de-ringing and de-blocking filtering, based on the second mode selection rule;
      configuring the configurable filter in response to the first configuration;
      filtering, by the configurable filter, image data; and
   in response to determining the first mode evaluation data does not match the first criteria, not filtering the image data.

2. A method for filtering image data, the method comprises:
   receiving a first mode selection rule; and receiving first image data;
   determining a second mode selection rule based on the first mode selection rule and the first image data;
   determining first mode evaluation data based on the second mode selection rule and second image data;
   in response to determining the first mode evaluation data matches first criteria:
      determining, by a configurable filter, a first configuration of the configurable filter that is adapted to perform de-ringing and de-blocking filtering, based on the second mode selection rule;

configuring the configurable filter in response to the first configuration; and filtering, by the configurable filter, image data; and in response to determining the first mode evaluation data does not match the first criteria, determining a third mode selection rule based on the second mode selection rule and based on the second image data.

3. The method according to claim 2 further comprising:

determining second mode evaluation data based on the second mode selection rule and third image data;

in response to determining the second mode evaluation data matches second criteria:

determining, by a configurable filter, a second configuration of the configurable filter that is adapted to perform de-ringing and de-blocking filtering, based on the third mode selection rule;

configuring the configurable filter in response to the second configuration; and filtering, by the configurable filter, image data.

4. The method according to claim 1 wherein the filtering and the determining the first configuration comprise manipulating current image data and previous image data.

5. The method according to claim 1 wherein the determining the first configuration comprises selecting a filter coefficient lookup table out of multiple filter coefficient lookup tables, and wherein the configuring comprises retrieving filter coefficients from the selected filter coefficient lookup table.

6. The method according to claim 1 wherein the determining the first configuration further comprises selecting a filtering control state machine out of multiple control state machines.

7. The method according to claim 1 wherein the filtering comprises de-ringing filtering and de-blocking filtering.

8. A device comprising:

at least one memory unit adapted to store image data;

a configurable filter adapted to apply de-ringing filtering and de-blocking filtering so as to filter image data retrieved from the at least one memory unit wherein the configurable filter is adapted to repetitively determine a configuration of the configurable filter based on a first mode selection rule, the first mode selection rule determined based on both received image data and a second mode selection rule, and adapted to configure the configurable filter based on the determination, wherein the configurable filter is adapted to determine the first mode selection rule based on a third mode selection rule and received image data.

9. The device according to claim 8 wherein the configurable filter is adapted to not filter the image data in response to determining mode evaluation data does not match a first criteria, the mode evaluation data based on the first mode selection rule and image data.

10. The device according to claim 8 wherein the configurable filter is adapted to manipulate current image data and previous image data.

11. The device according to claim 8 wherein the configurable filter comprises multiple configurable add-subtract circuits.

12. The device according to claim 8 wherein the device comprises multiple filter coefficient lookup tables, and wherein the configurable filter is adapted to retrieve filter coefficients from a selected filter coefficient lookup table.

13. The device according to claim 8 wherein the configurable filter comprises multiple filter control state machines.

14. The device according to claim 8 wherein the device is adapted to serially perform de-blocking filtering and de-ringing filtering by the configurable filter.

15. A device comprising:

at least one memory unit adapted to store image data;

a configurable filter adapted to apply de-ringing filtering and de-blocking filtering so as to filter image data retrieved from the at least one memory unit wherein the configurable filter is adapted to repetitively determine a configuration of the configurable filter based on a first mode selection rule, the first mode selection rule determined based on both received image data and a second mode selection rule, and adapted to configure the configurable filter based on the determination, wherein the configurable filter comprises a modes lookup table that includes multiple entries, each stores successful evaluation filter mode information and failed evaluation filter mode information.

16. The device according to claim 8 wherein:

the configurable filter comprises a modes lookup table that stores successful evaluation filter mode information and failed evaluation filter mode information;

the configurable filter is adapted to scan the modes lookup table until a valid filtering mode is found.

17. The device according to claim 8 wherein: the configurable filter comprises multiple configurable add-subtract circuits; each add-subtract circuit is utilized in each filtering mode.

18. The device according to claim 8 wherein the configurable filter comprises a mask decoder adapted to indicate which condition out of multiple conditions to check in order to evaluate a filtering mode.

19. The method according to claim 1 wherein the determining the first configuration comprises reading at least one entry of a modes lookup table that includes multiple entries, each stores successful evaluation filter mode information and failed evaluation filter mode information.

20. A method for filtering image data, the method comprises:

receiving a first mode selection rule; and receiving first image data;

determining a second mode selection rule based on the first mode selection rule and the first image data;

determining first mode evaluation data based on the second mode selection rule and second image data;

in response to determining the first mode evaluation data matches first criteria:

determining, by a configurable filter, a first configuration of the configurable filter that is adapted to perform de-ringing and de-blocking filtering, based on the second mode selection rule, wherein the determining the first configuration comprises scanning a modes lookup table that stores successful evaluation filter mode information and failed evaluation filter mode information, until a valid filtering mode is found;

configuring the configurable filter in response to the first configuration; and filtering, by the configurable filter, image data.

21. The method according to claim 1 wherein the filtering comprises utilizing each of multiple configurable add-subtract circuits in each filtering mode.

22. The method according to claim 1 wherein determining the first configuration comprising determining, in response to an output of a mask decoder, which condition out of multiple conditions to check in order to evaluate a filtering mode.

* * * * *